(12) United States Patent
Baugh

(10) Patent No.: US 12,084,939 B2
(45) Date of Patent: Sep. 10, 2024

(54) METHOD FOR AUTOFRETTAGE ON A BLOWOUT PREVENTER BODY

(71) Applicant: Benton Frederick Baugh, Houston, TX (US)

(72) Inventor: Benton Frederick Baugh, Houston, TX (US)

(*) Notice: Subject to any disclaimer, the term of this patent is extended or adjusted under 35 U.S.C. 154(b) by 515 days.

(21) Appl. No.: 17/386,808

(22) Filed: Jul. 28, 2021

(65) Prior Publication Data

US 2023/0031246 A1 Feb. 2, 2023

(51) Int. Cl.
*E21B 33/06* (2006.01)
*B23P 9/02* (2006.01)
*E21B 33/064* (2006.01)
*G01M 99/00* (2011.01)

(52) U.S. Cl.
CPC .............. *E21B 33/061* (2013.01); *B23P 9/02* (2013.01); *E21B 33/064* (2013.01); *G01M 99/007* (2013.01)

(58) Field of Classification Search
CPC .......... E21B 33/06; E21B 33/061; B23P 9/00; B23P 9/02; B23P 9/025; C21D 7/02; C21D 7/04; C21D 7/10; C21D 7/12; B21D 26/033; B21D 26/041
USPC ..... 72/54, 55, 58, 61, 62; 166/335, 363, 364
See application file for complete search history.

(56) References Cited

U.S. PATENT DOCUMENTS

2007/0256864 A1* 11/2007 Robichaux ............. E21B 17/05
175/57
2009/0056132 A1* 3/2009 Foote ..................... E21B 33/06
29/890.131

FOREIGN PATENT DOCUMENTS

| JP | 2010043920 A | * | 2/2010 | ........... B21D 26/033 |
| JP | 2012087356 A | * | 5/2012 | ............... B23P 9/00 |
| WO | WO-2011070063 A1 | * | 6/2011 | ............... B23P 9/00 |

* cited by examiner

*Primary Examiner* — Christopher L Templeton
*Assistant Examiner* — P Derek Pressley

(57) ABSTRACT

In a blowout preventer body having a central bore a method of reducing the size and weight of the blowout preventer body while maintaining an acceptable stress level at working pressure comprising machining a portion of the blowout preventer body to proximate the final dimensions, pressuring the blowout preventer body to a higher pressure than the working pressure of the blowout preventer body to yield high stress areas of the blowout preventer body, and relieving the higher pressure from the blowout preventer body such that when the blowout preventer body returns to the non-pressured state the high stress areas will retain compressive stresses and when the blowout preventer body is then pressurized to the working pressure of the blowout preventer body the stresses will be at an acceptable stress level.

8 Claims, 7 Drawing Sheets

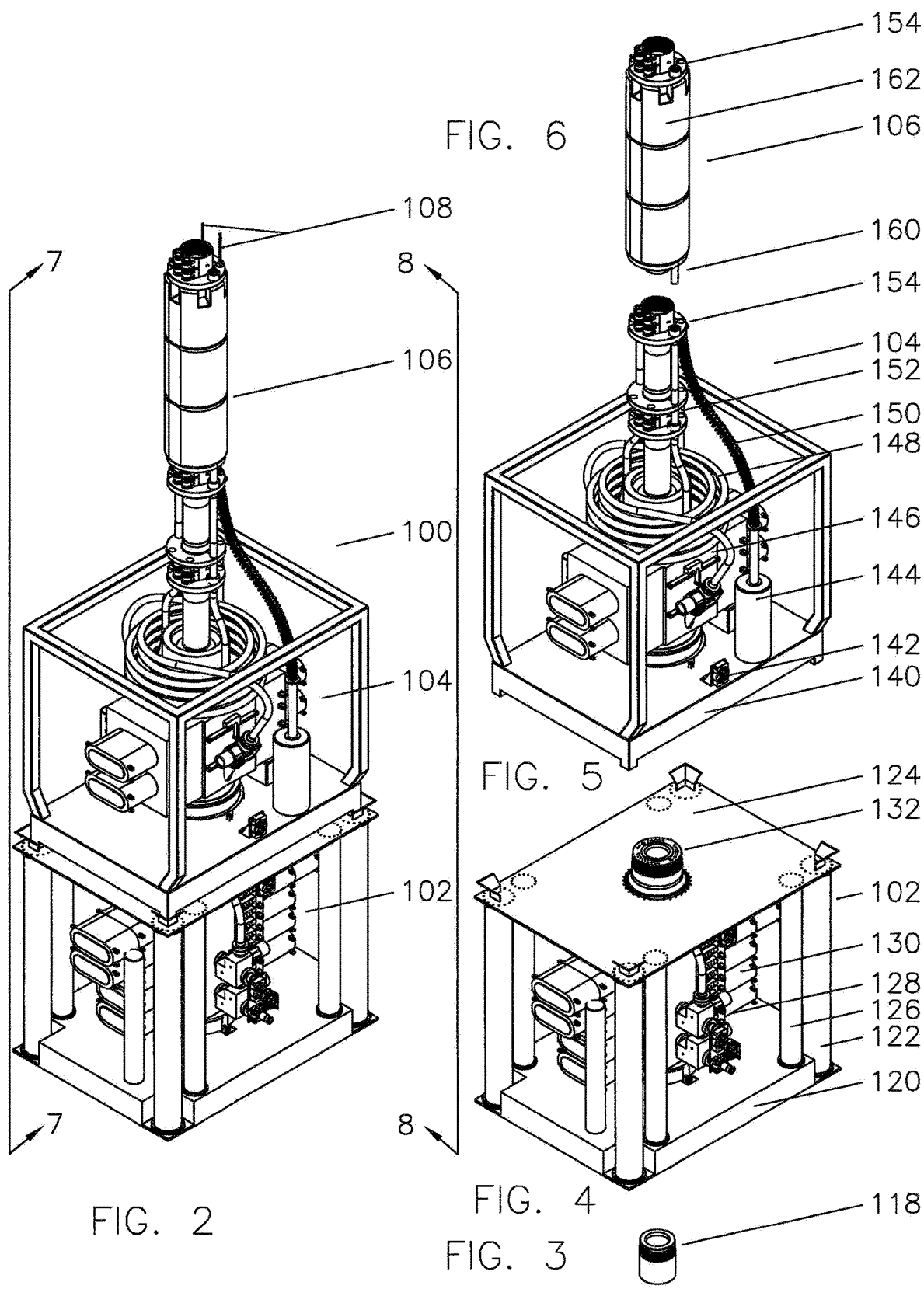

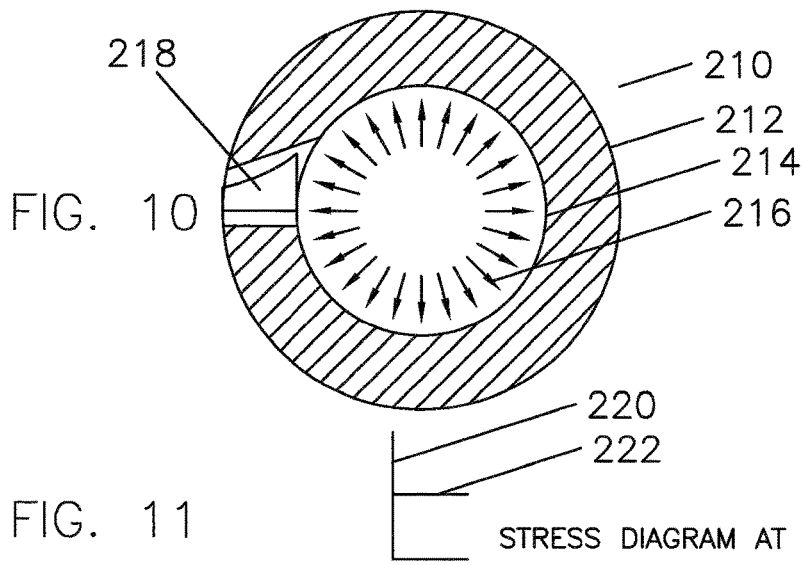
FIG. 10
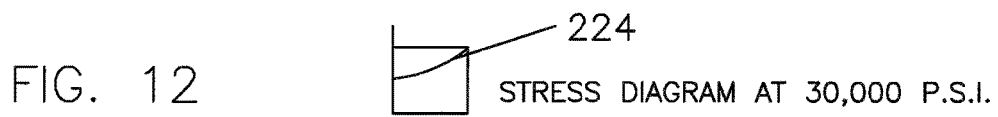
FIG. 11    STRESS DIAGRAM AT 0 P.S.I.
FIG. 12    STRESS DIAGRAM AT 30,000 P.S.I.
FIG. 13    STRESS DIAGRAM AT 0 P.S.I.
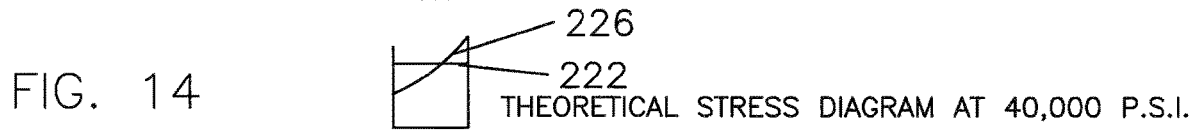
FIG. 14    THEORETICAL STRESS DIAGRAM AT 40,000 P.S.I.
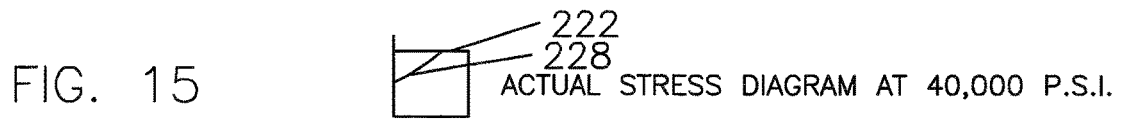
FIG. 15    ACTUAL STRESS DIAGRAM AT 40,000 P.S.I.
FIG. 16    STRESS DIAGRAM AT 0 P.S.I.
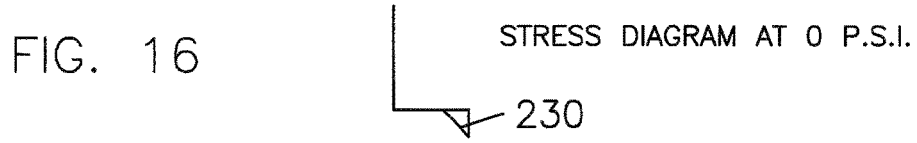
FIG. 17    STRESS DIAGRAM AT 30,000 P.S.I.

METHOD FOR AUTOFRETTAGE ON A BLOWOUT PREVENTER BODY

TECHNICAL FIELD

This invention relates to the method of providing performing an autofrettage operation on a blowout preventer body, especially as it applies to a 20,000 p.s.i. blowout preventer stack.

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

Deepwater offshore drilling requires that a vessel at the surface be connected through a drilling riser and a large blowout preventer stack to the seafloor wellhead. The seafloor wellhead is the structural anchor piece into the seabed and the basic support for the casing strings which are placed in the well bore as long tubular pressure vessels. During the process of drilling the well, the blowout preventer stack on the top of the subsea wellhead provides the second level of pressure control for the well. The first level being provided by the weighted drilling mud within the bore.

During the drilling process, weighted drilling mud circulates down a string of drill pipe to the drilling bit at the bottom of the hole and back up the annular area between the outside diameter of the drill pipe and the inside diameter of the drilled hole or the casing, depending on the depth.

Coming back up above the blowout preventer stack, the drilling mud will continue to travel back outside the drill pipe and inside the drilling riser, which is much large than the casing. The drilling riser has to be large enough to pass the casing strings run into the well, as well as the casing hangers which will suspend the casing strings. The bore in a contemporary riser will be at least twenty inches in diameter. It additionally has to be pressure competent to handle the pressure of the weighed mud, but does not have the same pressure requirement as the blowout preventer stack itself.

As wells are drilled into progressively deeper and deeper formations, the subsurface pressure and therefore the pressure which the blowout preventer stack must be able to withstand becomes greater and greater. This is the same for drilling on the surface of the land and subsea drilling on the surface of the seafloor. Early subsea blowout preventer stacks were of a 5,000 p.s.i. working pressure, and over time these evolved to 10,000 and 15,000 p.s.i. working pressure. As the working pressure of components becomes higher, the pressure holding components naturally become both heavier and taller. Additionally, in the higher pressure situations, redundant components have been added, again adding to the height. The 15,000 blowout preventer stacks have become in the range of 800,000 lbs. and 80 feet tall. This provides enormous complications on the ability to handle the equipment as well as the loadings on the seafloor wellhead. In addition to the direct weight load on the subsea wellheads, side angle loadings from the drilling riser when the surface vessel drifts off the well centerline are an enormous addition to the stresses on both the subsea wellhead and the seafloor formations.

When the blowout preventer stack working pressure is increased to 20,000 p.s.i. some estimates of the load is that it increases from 800,000 to 1,200,000 lbs. The height also increases, but how much is unclear at this time but it will likely approach 100 feet in height.

A second complication is that a 20,000 p.s.i. working pressure requires a 30,000 p.s.i. test pressure. As the actual stresses in material is greater than the bore pressure, the differential between the actual stress level and the yield strength of the material becomes much narrower. Imagine for a 15,000 p.s.i. component the maximum stress is 32,000 p.s.i. at working pressure and 48,000 p.s.i. at the 22,500 p.s.i. required test pressure. If the best reasonably available material has a 75,000 p.s.i. yield strength at that point you are working with a 1.56/1 factor. If you simply increase the working pressure to 20,000 p.s.i. with a 30,000 p.s.i. test pressure, the stress at test pressure goes to 72,000 p.s.i. which has barely a 1.04/1 safety factor. With the complications of stress analysis, even doubling the weight of the components will not get the stress levels back down to a reasonable level.

Weight and size have long been problems for the offshore industry, but with the new 20,000 p.s.i. and some 25,000 p.s.i. blowout preventer requirements, the need for new approaches to solving the problem has been exacerbated to a great degree.

BRIEF SUMMARY OF THE INVENTION

The object of this invention is to reduce the size, weight, and complexity of subsea blowout preventer stacks by applying the principles of autofrettage.

A second object of this invention is reduce the cost of subsea blowout preventer stacks.

A third object of this invention is keep the size and weight of 20,000 p.s.i. blowout preventer stacks in the same range of size and weight of 10,000 and 15,000 p.s.i. blowout preventer stacks so that the same offshore drilling vessels can be upgraded for 20,000 p.s.i. service.

Another object of this invention is to make it practical to use currently available materials in 20,000 p.s.i. service.

BRIEF DESCRIPTION OF THE DRAWINGS

FIG. 2 is a perspective view of a blowout preventer stack utilizing the features of this invention.

FIG. 3 is a perspective view of a subsea wellhead housing which the blowout preventer stack of this invention would land on.

FIG. 4 is a perspective view of the lower portion of the blowout preventer stack of FIG. 2, generally called the lower BOP stack.

FIG. 5 is a perspective view of the upper portion of the blowout preventer stack of FIG. 2, generally called the lower marine riser package or LMRP.

FIG. 6 is a perspective view of a section of the drilling riser which will be used to lower the blowout preventer stack.

FIG. 10 is a cross section of a piece of pipe to begin an autofrettage discussion.

FIG. 11 is a diagram of stress in the pipe a 0 p.s.i.

FIG. 12 is a diagram of stress in the pipe at 30,000 p.s.i.

FIG. 13 is a diagram of stress in the pipe returned to 0 p.s.i.

FIG. 14 is a diagram of theoretical stress in the pipe at 40,000 p.s.i.

FIG. 15 is a diagram of actual stress in the pipe at 40,000 p.s.i. when the yield strength of the pipe is 30,000 p.s.i.

FIG. 16 is a diagram of the stress in the pipe when returned to 0 p.s.i.

FIG. 17 is a diagram of the stress in the pipe when pressured to 30,000 p.s.i. again.

DETAILED DESCRIPTION OF THE INVENTION

Figure 1:
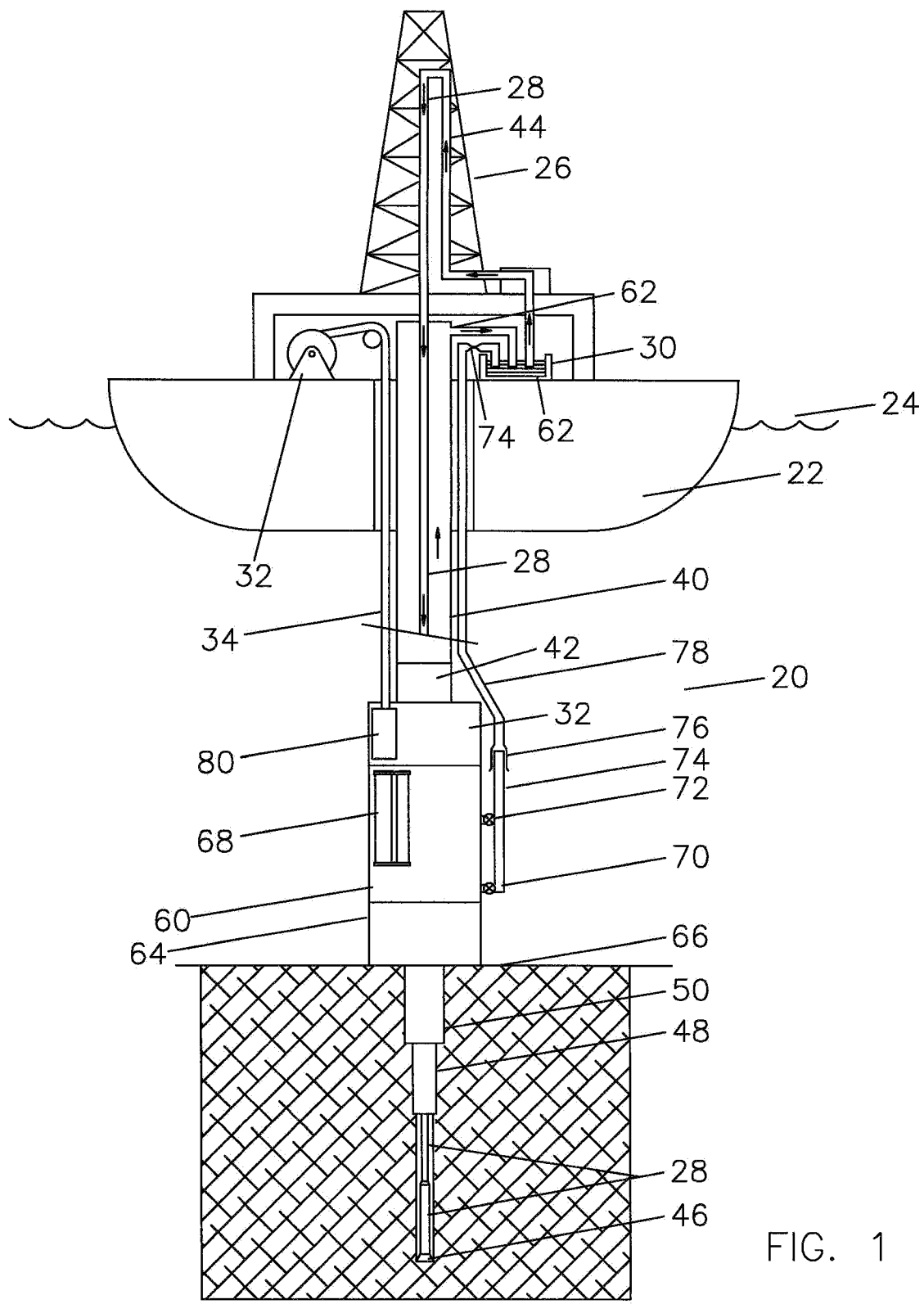
FIG. 1 is a view of a contemporary deep-water riser system.

Referring now to FIG. 1, a view of a system 20 which might use the present invention is shown. It shows a floating vessel 22 on a body of water 24 and having a derrick 26. Drill pipe 28, drilling mud system 30, control reel 32, and control cable 34 are shown. A riser system 40 including a flex joint 42 is shown. During drilling the drilling mud circulated from the drilling mud system 30, up the standpipe 44, down the drill pipe 28, through the drill bit 46, back up through the casing strings 48 and 50, through the blowout preventer stack 60, up thru the riser system 40, and out the bell nipple at 62 back into the mud system 30.

Blowout preventer stack 60 is landed on a subsea wellhead system 64 landed on the seafloor 66. The blowout preventer stack 60 includes pressurized accumulators 68, kill valves 70, choke valves 72, choke and kill lines 74, choke and kill connectors 76, choke and kill flex means 78, and control pods 80.

Referring now to FIG. 2, the seafloor drilling system 100 comprises a lower blowout preventer stack 102, a lower marine riser package 104, a drilling riser joint 106, and control cables 108.

Referring now to FIG. 3, a subsea wellhead is shown which the seafloor drilling system lands on. It is the unseen upper portion of the subsea wellhead system 64 shown in FIG. 1.

Referring now to FIG. 4, the lower blowout preventer stack 102 comprises a lower structural section 120, vertical support bottle 122, and upper structural section 124, accumulators 126, choke and kill valves 128, blowout preventers 130 and an upper mandrel 132 which will be the connection point for the lower marine riser package.

Referring now to FIG. 5 the lower marine riser package 104 is shown comprising a lower marine riser package structure 140, an interface 142 for a remotely controlled vehicle (ROV), annular blowout preventers 146, choke and kill flex loops 148, a flexible passageway 150, a riser connector 152, and an upper half of a riser connector 154.

Referring now to FIG. 6, a drilling riser joint 106 is shown having a lower half of a riser connector 160, a upper half of a riser connector 154, and buoyancy sections 162.

Figure 7:
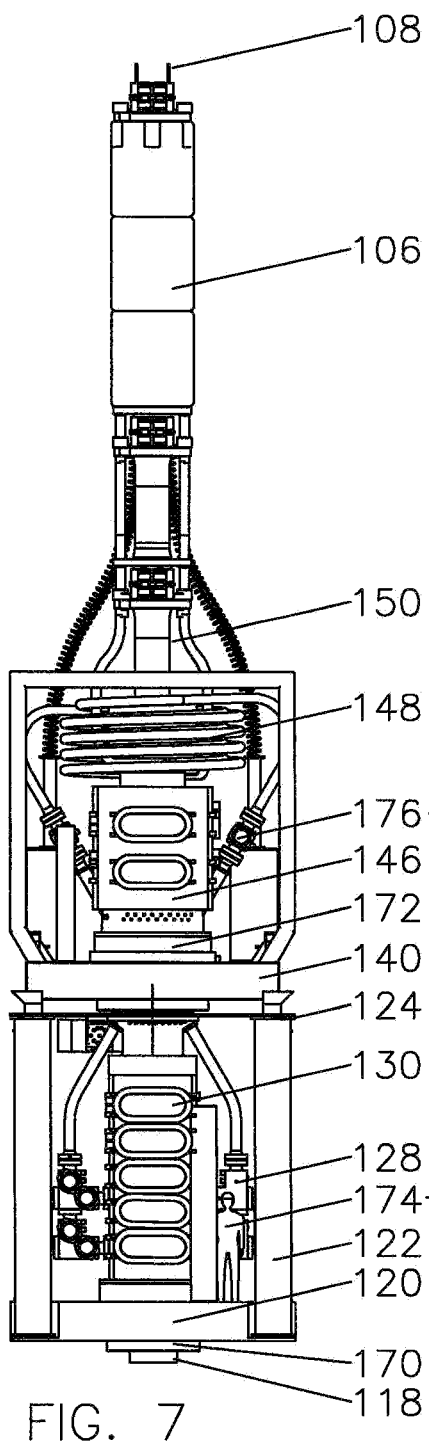
FIG. 7 is a view of the blowout preventer stack of FIG. 2, taken along lines "7-7.

Referring now to FIG. 7, is a view of seafloor drilling system 100 taken along lines "7-7" of FIG. 1 showing wellhead connector 170, lower marine riser connector 172, a man 174 for size perspective, and choke and kill valves 176.

Figure 8:
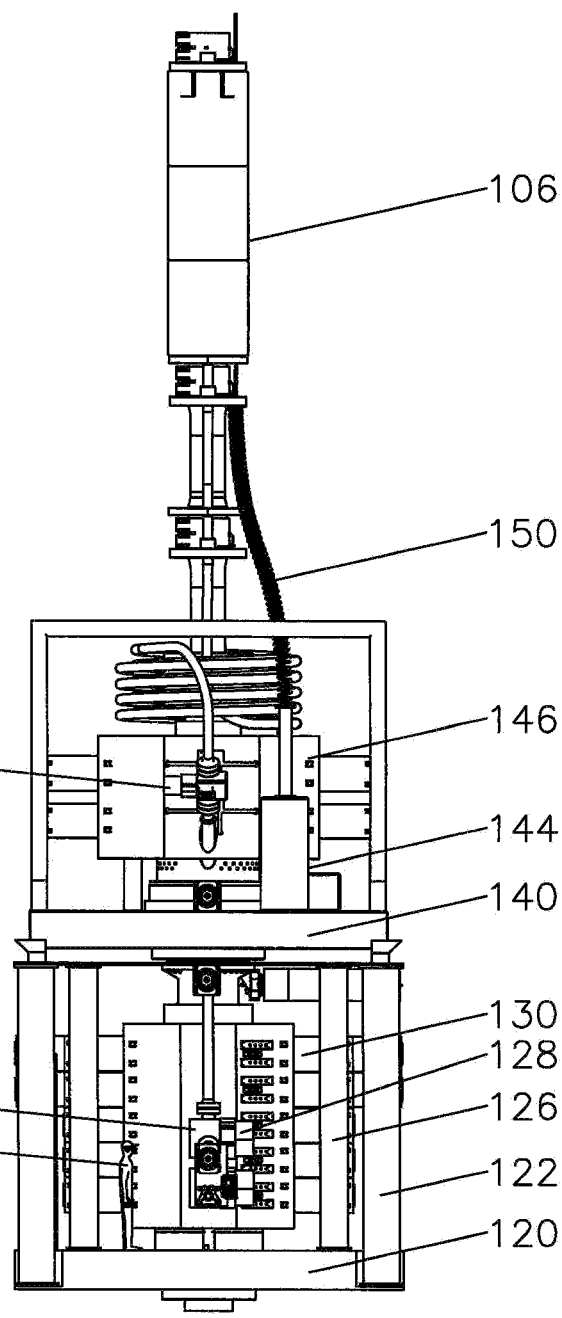
FIG. 8 is a view of the blowout preventer stack of FIG. 2, taken along lines "8-8.

Referring now to FIG. 8, is a view of seafloor drilling system 100 taken along lines "8-8" of FIG. 1.

Figure 9:
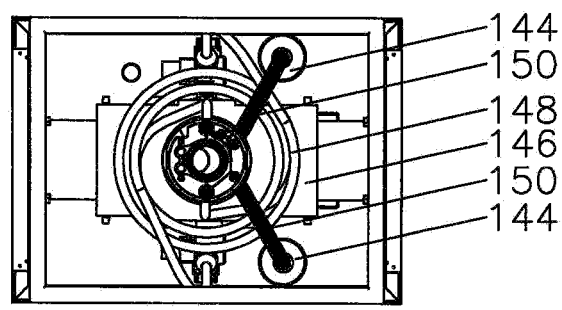
FIG. 9 is a top view of FIG. 8.

Referring now to FIG. 9, is a top view of seafloor drilling system 100.

Referring now to FIG. 10 a cross section of a pipe 210 is shown with and outside diameter 212, and inside diameter 214, and an internal pressure 216. Stress diagram 218 is shown generally showing the stress resulting in the pipe 210 as a result of the internal pressure 216 is shown, as will be discussed in the next figures.

Referring now to FIG. 11, the stress in the pipe 210 is shown when the internal pressure is zero, presuming there is no residual stress in the pipe 210. In the figure, 220 is generally showing the stress intensity and line 222 is showing the yield strength of the material.

Referring now to FIG. 12, the stress intensity curve 224 is shown in the pipe wall when the internal pressure is 30,000 p.s.i. This is the same curve as was shown in FIG. 72 as stress diagram 218. In this case, the stress in the pipe 210 does not reach yield strength, so the pipe material is not yielded.

Referring now to FIG. 13, the stress diagram is shown when the internal pressure is returned to zero, and is functionally the same diagram as was shown in FIG. 11.

Referring now to FIG. 14, the theoretical stress intensity curve 226 is shown if the pipe 210 was pressured to 40,000 p.s.i.

Referring now to FIG. 15, the actual stress intensity curve of pipe 210 at 40,000 p.s.i. is shown with the curve 228 now being truncated to not exceed the yield stress curve 222.

Referring now to FIG. 16, stress intensity curve 230 shown the resulting stress pattern when the 40,000 p.s.i. pressure stress is released back to zero p.s.i. and the pipe strain goes back to as it will at zero p.s.i. The portion of the pipe which went into yield actually goes into compression and has a residual negative or compression stress in it.

Referring now to FIG. 17, when pipe 210 is then tested to 30,000 p.s.i. the stress intensity curve shown by portions 230 and 232 results. Portion 232 is the same as the 30,000 p.s.i. curve 224 seen in FIG. 12. Portion 234 is the curve 224 as seen in FIG. 12 minus the residual stress as indicated by portion 232 in FIG. 16. The resulting combination provides a much more generous safety factor than the pipe 210 as seen in FIG. 12 before this autofrettage process was done on the pipe 210. As can be seen advantage can be gained in autofrettage on plain round pipe where the stresses are relatively uniform. The gains are more significant on irregular shapes where there are stress concentrations in the corners.

Figures 18, 19:
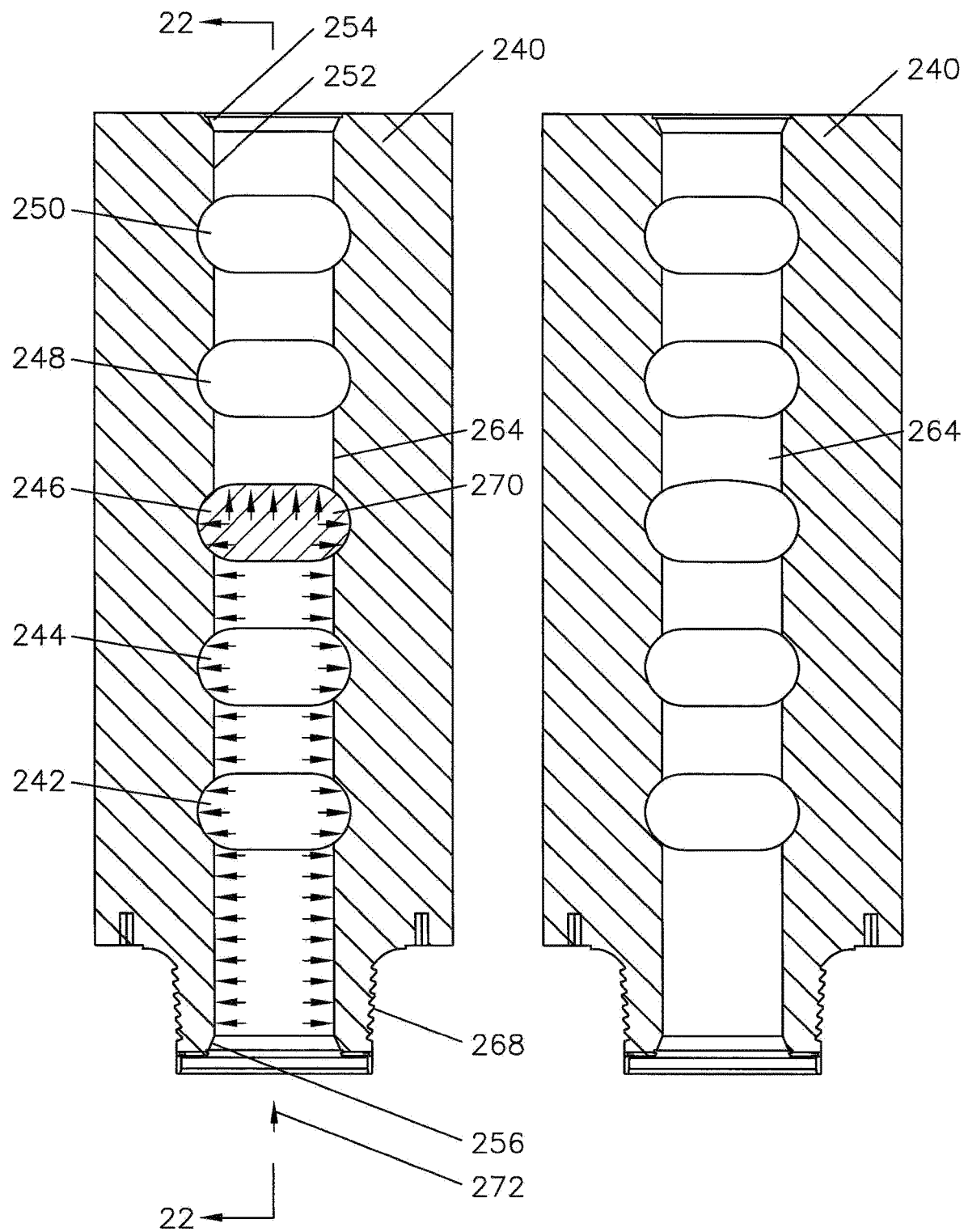
FIG. 18 is cross section of a blowout preventer body with 5 ram cavities as if rams in the middle cavity are closed and it is being pressured to a high pressure from the bottom showing the wetted or tested surfaces.
FIG. 19 is the same cross section as FIG. 18 showing potential deformation due to the high pressure.

Referring now to FIG. 18, blowout preventer body 240 is shown to have 5 ram cavities 242-250, bore 252, upper seal preparation 254, lower seal preparation 256, and lower connector profile 268. Ram 270 is shown in place as a sealing ram and for this illustration the other ram cavities remain empty. When pressure enters from the bottom as shown by arrow 272, the surfaces of the bore 252 and ram cavities 242, 244, and 246 are shown to be subjected to the fluid pressure. Ram cavity 242 shows pressure applied and an end condition, ram cavity 244 shows pressure applied and the same condition above and below, ram cavity 246 shows pressure applied and no pressure above it, ram cavity 248 shows no pressure applied but will have some stress impact from the pressure below, and ram cavity 250 shows no pressure applied and an end condition. Ram cavities 242, 244, and 246 will be subject to some deformation during the application of autofrettage pressure levels as will bulkhead 264.

Referring now to FIG. 19, bulkhead 264 is shown deformed as would happen during the application of autofrettage pressure, although the deformation is exaggerated for visibility. Most of the surfaces wetted by the autofrettage pressure fluid below will be subject to deformation, but to a lesser extent.

Figure 20:
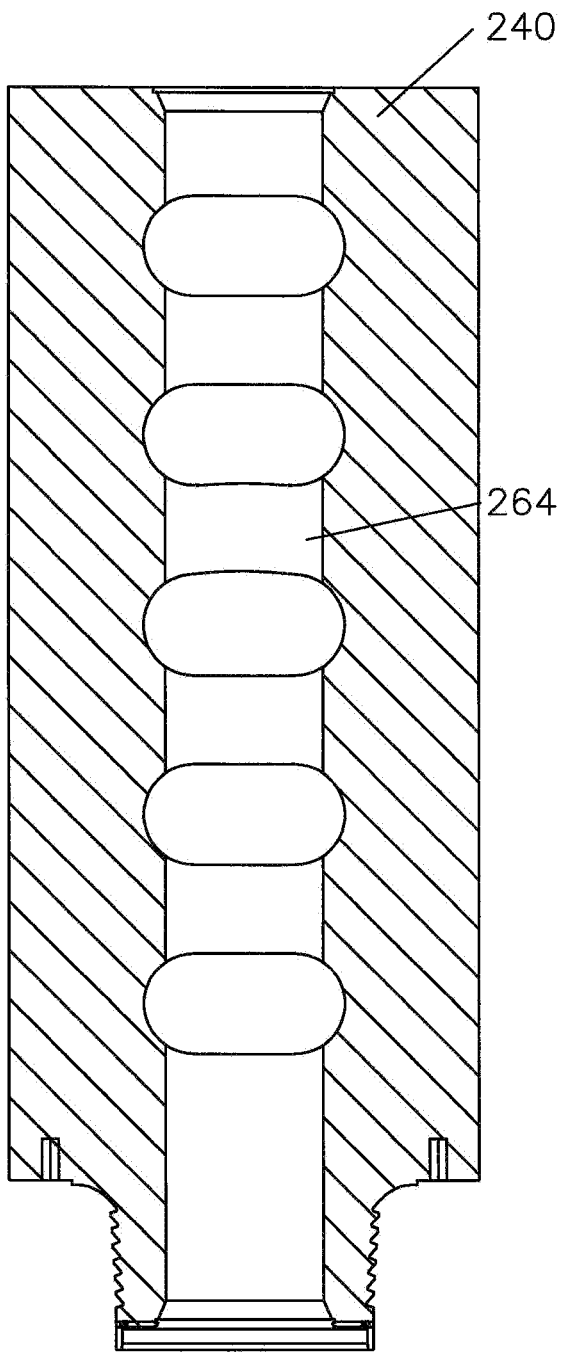
FIG. 20 is basically the same figure as FIG. 18 showing the body will not be deformed again upon expose to working pressure.

Referring now to FIG. 20, bulkhead 224 is shown with the residual deformation which remains after the autofrettage pressure is removed. The shape has been permanently deformed, and will not be deformed again upon the application of a regular test pressure in this case of only 30,000 p.s.i.

Figure 21:
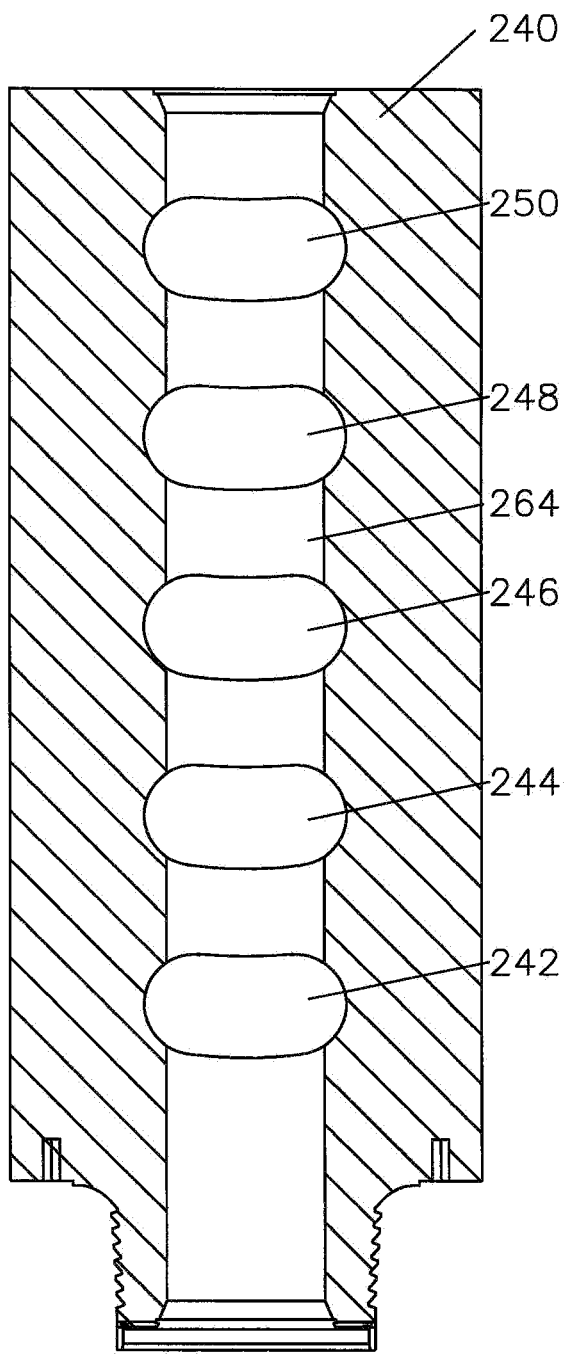
FIG. 21 shows how slight changes in manufacturing might be done to take advantage of autofrettage operations to bring the body into the desired shape.

Referring now to FIG. 21, blowout preventer body 240 is shown to be manufactured with bulkhead 264 having the mirror image shape as was seen in FIG. 20. Now when blowout preventer body 200 is subject to the autofrettage pressure of 40,000 p.s.i., it will be deformed to the desired shape which was originally seen in FIG. 18. Similarly the ram cavities 242, 244, 248, and 250 can be autofrettage tested to determine the amount of permanent deformation which will happen to each of them and determine their appropriate starting shapes. With today's accurate computer controlled manufacturing processes such as wire EDM (electrical discharge machining), each ram pocket can have a unique shape to match their physical location conditions to end up with the correct shape after autofrettage testing.

Figure 22:
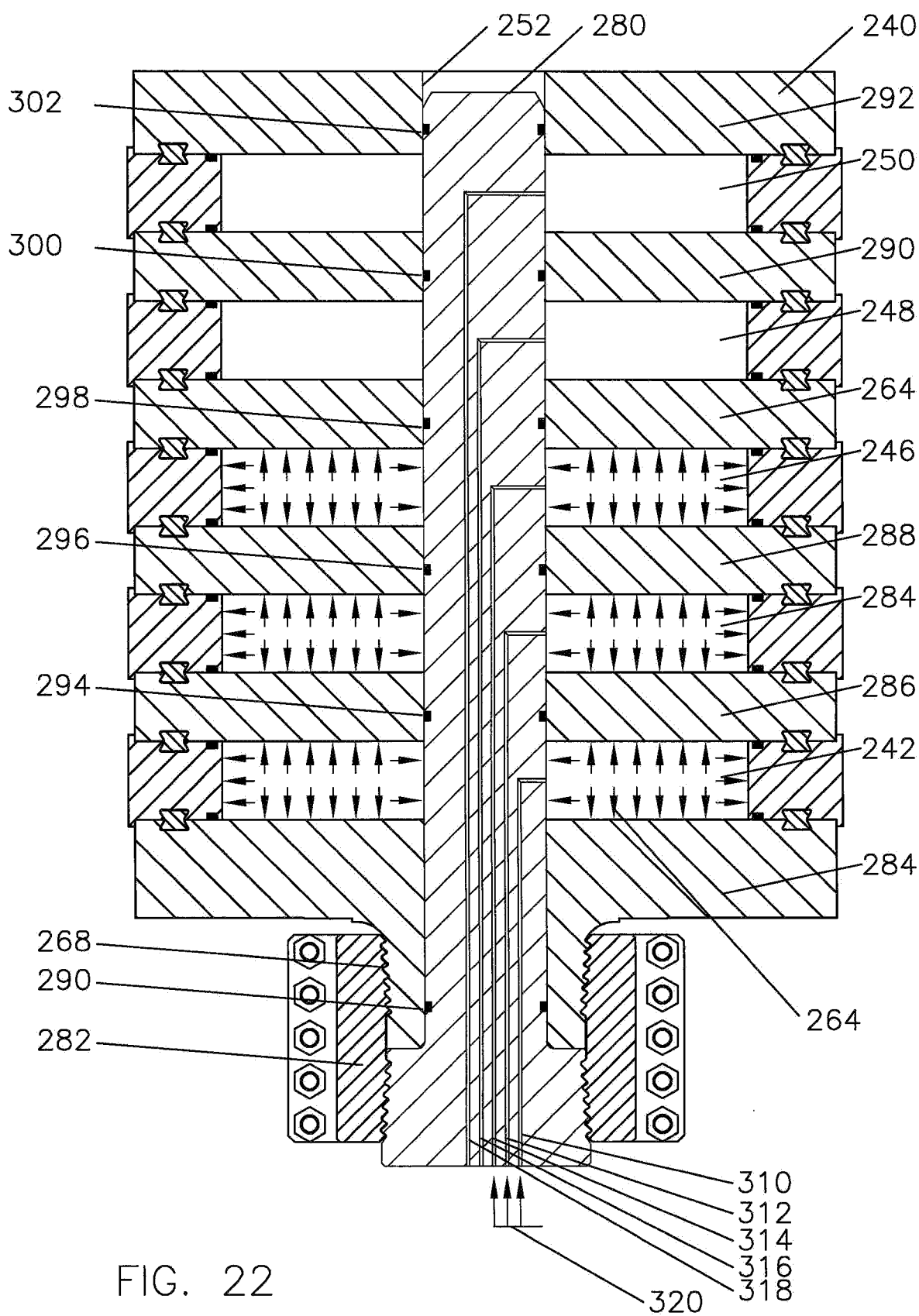
FIG. 22 is a taken along lines "22-22" of FIG. 18 and shows a cross section through the 5 ram blowout preventer body with a test plug in the center and the ends of the ram cavities being capped.

Referring now to FIG. 22, which is taken along lines "22-22" of FIG. 18 blowout preventer body 240 is shown is the state ready for autofrettage testing rather than the finished shape as seen in FIG. 18. Test plug 280 is inserted into bore 252 and is connected to connector profile 268 by multi-segment bolted clamp 282 which is designed to carry the axial autofrettage forces although they are not being imparted in this embodiment. Bulkhead areas 284, 286, 288, 264, 290, and 292 are sealed with seals 294, 296, 298, 300, and 302 respectively. Seals 294-302 will need to be equipped with anti-extrusion devices as the bore 252 will be expanding and the autofrettage pressures will be high. Test ports 310, 312, 314, 316, and 318 communicate with ram cavities 242, 244, 246, 248, and 250 respectively.

As shown autofrettage pressure 320 is manifolded into ports 310, 312, and 314 to pressure ram cavities 242, 244, and 246 and the bore area between seals 290 and 298, providing the high stress on bulkheads 284 and 264. In an actual autofrettage sequence, port 310 would be pressured to load bulkheads 284 and 286 and the bore area between, then ports 310 and 312 would be pressured to load bulkheads 284 and 288 and the bore area between, then ports 310, 312 and 314 would be pressured to load bulkheads 284 and 264 and the bore area between, then ports 310, 312, 314 and 316 would be pressured to load bulkheads 284 and 290 and the bore area between, and then ports 310, 312, 314, 316 and 318 would be pressured to load bulkheads 284 and 292 and the bore area between. In this way each of the six bulkheads above and below each of the five ram cavities would experience the differential pressures to cause autofrettage deformation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

SEQUENCE LISTING

N/A

That which is claimed is:

1. A method of autofrettage processing for a well drilling blowout preventer stack ram blowout preventer body, the method comprising:
providing a ram blowout preventer body comprising an elongate body with a longitudinally oriented central bore, an internal wall of the central bore terminating in through-hole apertures at each of first and second longitudinal ends of the elongate body, the central bore having multiple pairs of ram cavities oriented transverse to and in communication with the central bore spaced apart longitudinally within the elongate body, the multiple pairs of ram cavities terminating at the central bore internal wall and terminating in through-hole apertures on lateral outer side surfaces of the elongate body;
machining a portion of the ram blowout preventer body proximate final dimensions,
sealing closed the central bore of the ram blowout preventer with a test plug having test seals which sealingly engage the central bore internal wall at the first and second longitudinal ends of the elongate body and the test seals sealingly engaging the central bore internal wall surfaces common between adjacent pairs of the ram cavities at least on either longitudinal side of a pair of the ram cavities located between the first and second longitudinal ends of the elongate body, the test plug having porting between each of the test seals;
pressuring the ram blowout preventer body to a pressure higher than a working pressure of the ram blowout preventer body to autofrettage areas of the ram blowout preventer body achieving a stress safety factor to yield strength of material used to make the elongate body of at least 1.5 to 1 at a test pressure, and
relieving the pressure from the ram blowout preventer body,
wherein stress within the ram blowout preventer body does not exceed two-thirds the yield strength of material used to make the elongate body when a test pressure is applied to the ram blowout preventer body.

2. The method of claim 1, wherein pressuring the ram blowout preventer body comprises individually pressuring any one pair of ram cavities of the multiple pair of ram cavities with the test plug where the test plug has multiple test seals arranged to sealingly engage the central bore internal wall common between each pair of adjacent ram cavities and porting arranged between each pair of test seals.

3. The method of claim 2 providing the blowout preventer body is a ram blowout preventer body with a pair of opposing ram cavities.

4. The method of claim 2 providing the test plug which provides the test seals which sealingly engage the bore of the blowout preventer body above a pair of the ram cavities, below a lower pair of the ram cavities, and provides porting between the test seals.

5. The method of claim 2, wherein the blowout preventer body is machined to a different shape than a desired shape and deformation from the higher pressure than the working pressure pressuring changes the shape of the blowout preventer body to being more like the desired shape.

6. The method of claim 1, wherein the ram blowout preventer body is machined to a different shape than a desired shape and deformation from the higher pressure than the working pressure pressuring changes the shape of the blowout preventer body to being more like the desired shape.

7. The method of claim 1 providing the blowout preventer body is a ram blowout preventer body with a pair of opposing ram cavities.

8. The method of claim 1 providing the test plug which provides the test seals which sealingly engage the bore of the blowout preventer body above a pair of the ram cavities, below a lower pair of the ram cavities, and provides porting between the test seals.

\* \* \* \* \*